(No Model.)

G. W. MORRIS.
VEHICLE SPRING.

No. 296,994.  Patented Apr. 15, 1884.

Witnesses:
Lutie Morris.
W. P. Chaffee

Inventor:
Geo. W. Morris
by Johnson & Johnson
Attorneys.

United States Patent Office.

GEORGE W. MORRIS, OF PITTSBURG, PENNSYLVANIA.

VEHICLE-SPRING.

SPECIFICATION forming part of Letters Patent No. 296,994, dated April 15, 1884.

Application filed February 13, 1884. (No model.)

*To all whom it may concern:*

Be it known that I, GEORGE W. MORRIS, a citizen of the United States, residing at Pittsburg, in the county of Allegheny and State of Pennsylvania, have invented new and useful Improvements in Wagon-Springs, of which the following is a specification.

My invention relates to elliptic springs, in which the leaves are of flat steel plates, usually secured in place one upon the other by being bolted together in the center, and nibbed and slotted near their ends, and secured by bolts to the axle. Other means have been devised for securing the leaves together without a center bolt—such as a band placed around them in the middle of their length. Such springs for railway-cars have been bound together by a band compressed, while heated, so as to be bound and compressed into the spring from all sides, to firmly and securely lock the leaves against displacement in any direction, as in the patent granted to A. French, July 17, 1877, and numbered 193,080.

My improvement is directed to the production of elliptic springs for wagons, in which the band is compressed upon the leaves, as stated, and to provide said band with means by which it is caused to lock the spring to the axle and to the bolts by which it is secured thereto. Under the present manner of bolting the springs to the axle they are liable to and do slip endwise out of place by the jarring action, and are thereby displaced from a true central position, which causes the wagon-body to lean to one side. The provision which I have made for preventing this consists in forming grooves in the sides of the band, into which the bolts are seated, which secure the spring to the axle, so that the spring being bound to the band and the latter locked to the bolts by the side grooves, the slipping of the spring upon the axle endwise over the bolts, as hitherto, is prevented, and a light, strong, and durable wagon-spring is produced.

Figure 1:
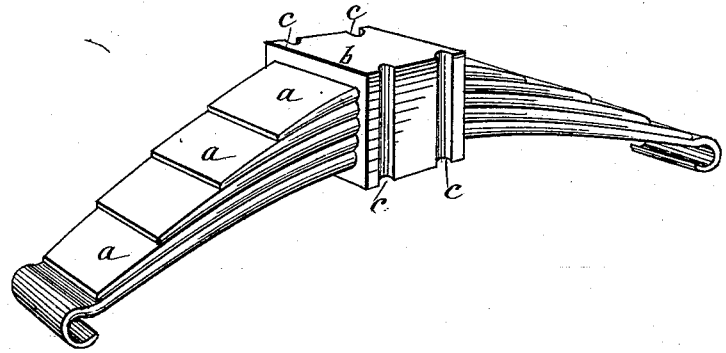
Figure 2:
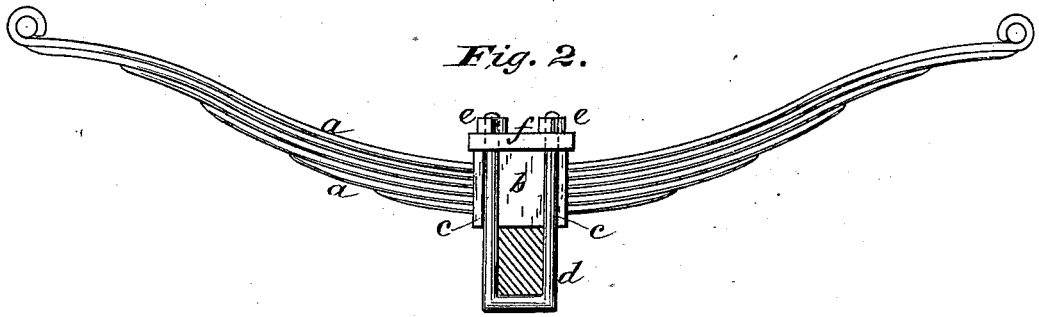
Figure 3:
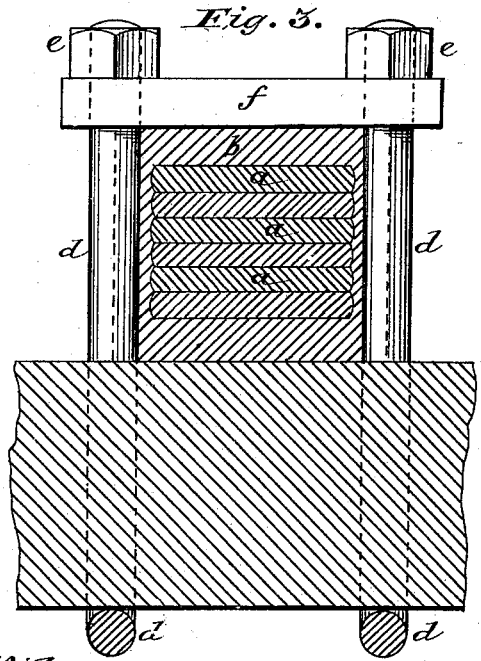
Figure 4:
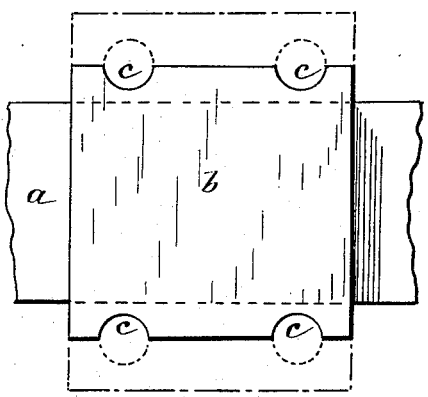

Referring to the accompanying drawings, Figure 1 represents a view in perspective of one-half of an elliptic spring, showing the compressed band with side grooves; Fig. 2, a side view of the same as secured by bolts to the axle; Fig. 3, a cross-section of the lower half of the spring, showing the bolts in the grooves in the opposite sides of the spring-band, and Fig. 4 a top view of the grooved band.

The spring is made of steel leaves $a$, banded by the compressed band $b$, as described in the said French patent. Before the band is placed upon the spring it is formed to suit the number of leaves thereof, with two grooves, $c\ c$, in its opposite vertical sides. These grooves are placed a distance apart to receive the usual clip-bolts, $d$, which embrace the axle, and are secured by nuts $e$ to the usual tie-plate, $f$, which lies upon the top of the band $b$ crosswise. The band-grooves $c\ c$ need be only deep enough to form seats for the bolts, so that the latter are locked to the sides of the band, and the latter is thereby prevented from slipping over the bolts endwise by the jarring action of the wagon, while the band being firmly bound and seated by independent seats on the edges of the spring-leaves, the latter are thereby locked to it, and the spring cannot be displaced from its central position.

While I prefer the compressed band as a means for locking the leaves thereto and increasing the strength of the spring, yet it is obvious that the leaves may be secured to each other and to the band by other means without perforating the leaves for a center bolt, and my improvement comprehends a banded spring with grooves in the vertical sides of the band to form locking-seats for the bolts, by which the spring is secured to the axle.

It will be understood that each half of an elliptic spring is banded, and that the band of each half is grooved, as described, to interlock with the securing-bolts.

I claim—

1. The band $b$, having grooves $c\ c$ in its vertical outer sides, in combination with the spring and the clip-bolts $d$, seated in said grooves, whereby to lock the band to the spring-securing bolts, substantially as described.

2. The elliptic half-spring having its leaves secured by a hot-pressed band, having grooves in its outer vertical walls, as shown, and for the purpose described.

In testimony whereof I have hereunto set my hand in the presence of two subscribing witnesses.

GEO. W. MORRIS.

Witnesses:
FRANK S. LAYING,
CHARLES W. JONES.